Nov. 24, 1953  D. C. LAW  2,659,914
DOCKBOARD
Filed July 31, 1950
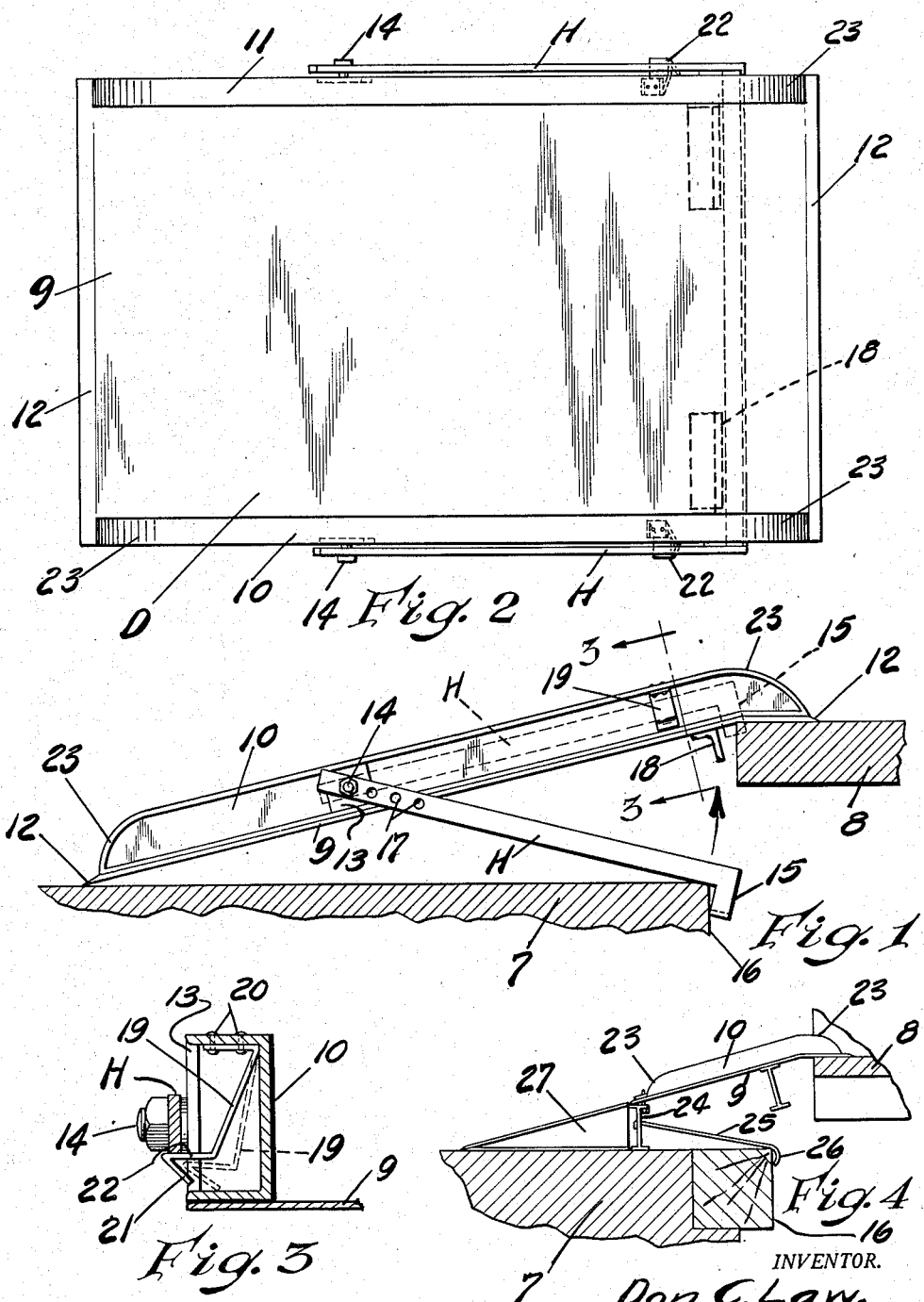
INVENTOR.
Don C. Law.
BY Frank C. Seaman.
ATTORNEY Patented Nov. 24, 1953

2,659,914

UNITED STATES PATENT OFFICE 2,659,914

DOCKBOARD

Don C. Law, Bay City, Mich., assignor to Magline, Inc., Pinconning, Mich., a corporation of Michigan Application July 31, 1950, Serial No. 176,788

4 Claims. (Cl. 14—72)

This invention relates to dockboards and more specifically to a reinforced metal plate board with raised side walls for spanning the floor gap between spaced floor surfaces.

One of the prime objects of the invention is to design a dockboard of simple, practical, and economical design, which is relatively light in weight so that it can be readily carried and placed to span the intervening space between freight cars, trucks and dock platforms to enable freight to be trucked between the car or vehicle and the platform.

Another object is to provide a dockboard having simple, convenient and easy locking means to prevent slippage of the dockboard due to sway of the car or vehicle that is being loaded or unloaded, or changes in the relative height of the carrier as the loading and/or unloading progresses.

A further object is to provide a dockboard especially adaptable for use with spaced-apart structures of different levels, and which can be safely and easily positioned and held against creepage or displacement to insure a continuous, unbroken surface from floor to floor.

A further object still is to design a dockboard including stops, and an adjustable drop lock bar hingedly and adjustably secured thereto so that it can be readily swung from engaged to disengaged position.

Still a further object is to provide resilient automatic latching means for securing the lock bar in raised position.

With the above and other objects in view, the present invention consists in the combination and arrangements of parts, hereinafter more fully described, illustrated in the accompanying drawing and more particularly pointed out in the appended claims, it being understood that changes may be made in the form, size, proportions, and minor details of construction, without departing from the spirit or sacrificing any of the advantages of the invention.

In the drawing:

Fig. 1 is a side elevational view of my new dockboard, showing also sectional, fragmentary sections of a dock and a transporting vehicle, the broken lines showing the lock bar in its raised position and the arrows indicating the direction of swing of the bar.

Fig. 2 is a top plan view thereof with the vehicle and dock omitted.

Fig. 3 is an enlarged, transverse sectional view taken on the line 3—3 of Fig. 1, the lock bar being shown in raised position, the broken lines showing the latch sprung to release the lock bar.

Fig. 4 is a view similar to Fig. 1 showing a slightly modified construction.

In general, the drawing illustrates a bridging ramp or dockboard between different level floor structures so that hand trucks and workmen may freely and continuously pass thereover, assuring a substantially even, continuous surface for rolling trucks or other vehicles to load or unload goods of all kinds.

The high and low level structures are indicated at 7 and 8, the numeral 7 indicating a platform or dock, and the numeral 8 indicating the floor of a vehicle, railroad car or other carrier.

The dockboard is generally indicated at D and comprises a plate 9 preferably formed of magnesium and having side rails 10 and 11 welded or otherwise secured to the opposite edges of the floor plate, and while at present I have shown the side rails as channel shaped in cross section to provide rigidity and a convenient hand hold to facilitate carrying and placing, it will be readily understood that they can be formed of any other shape desired without departing from the spirit of the invention.

The ends of the floor plate 9 are beveled as at 12 to eliminate bumps as the trucks (not shown) are wheeled thereover, and the upper end of the plate and side rails are formed at a slight angle as shown to provide maximum bearing surface on the carrier.

A lock bar H is hingedly connected to the side rails 10 and 11, the free ends of the bar being hingedly connected to the plates 13 which span the flanges of the channel-shaped side rails by means of bolts 14.

The closed end of the lock bar H is bent downwardly as at 15, these bent sections being connected as shown, so that when in set position it readily engages the vertical wall 16 of the dock or platform 7, the pivotal connection permitting the bar to be swung upwardly to position shown in broken lines in Fig. 3 of the drawing for transportation and compact packing or for any other reason.

Spaced-apart openings 17 are formed in the legs of the lock bar H to permit adjustment when desired, and stops or reinforcing members 18 are provided on the bottom face of the tread plate 9 for engagement with the floor of the vehicle 8, and these can extend entirely across the dockboard or can be short strips, said members serving as reinforcement and stops to limit the upward movement or creeping of the structure should such tendency develop.

Resilient latch members 19 are riveted or otherwise secured to the side rails 10 and 11 by means of rivets 20, the lower free end being formed with an angularly disposed section 21 which is forced inwardly when the lock bar H is swung up, the bar being supported on the flat jaw section 22 to hold it in raised position when shipping or when not in use, and it is merely ncessary to press the latch members inwardly as shown in broken lines in Fig. 3 of the drawing to release the lock bar.

The face of the wear or tread plate 9 can be suitably treated to provide a non-skid surface, and the ends of the side rails are preferably curved as at 23 to eliminate sharp corners and present a neat and pleasing appearance.

In the modified construction shown in Fig. 4, I provide transversely disposed members 24 as shown, and hook-shaped locking members 25 are hingedly secured to the member 24, the end of each member being hook-shaped as at 26 to engage the front wall 16 as previously described, and these members 24 are preferably individual and can be swung up over the ramp section 27 when desired.

While I have herein shown but two related designs, it is to be understood that various changes may be made as regards the structure herein disclosed provided the means stated by any of the following claims or the equivalent of such stated means be employed.

What I claim is:

1. In a dockboard adapted to span the space between and provide a connecting runway between two spaced-apart floor structures of different height, a floor plate having raised side rails channel shape in cross section with the flanges thereof extending outwardly, plates spanning the flanges of said side rails adjacent the rear ends thereof, a unitary locking bar to hook over the wall of the lower floor structure and prevent rearward shifting of said dockboard pivotally and removably connected to the outer faces of said plates, said locking bar comprising a pair of legs having downwardly turned hook ends connected by a cross bar, the free ends of said locking bar being connected to said plates, a plurality of openings in the free ends of said locking bar to permit its lengthwise adjustment with relation to said plates, resilient latch members on the outer faces of said rails adjacent the front ends thereof to retain said locking bar in inoperative position, said latch member being affixed to the underface of the upper flanges of said channel-shaped side rails, thence leading outwardly and downwardly from the outer side faces of said rails, thence being turned horizontally and extending outwardly through the vertical planes of the legs of said locking bar to form shelves on which the respective legs of said locking bar are retained when the bar is raised to inoperative position, said latches terminating in inwardly and downwardly bent portions which are disposed in the path of the length of said locking bar so as to be engaged by said legs when said locking bar is swung upwardly to press said latches inwardly and permit said legs to be raised to inoperative position, and stop means depending from the front end of the dockboard to engage the wall of the foremost floor structure and prevent forward slipping of said dockboard.

2. In a dockboard adapted to span between and provide a connecting runway between two spaced-apart floor structures of different height, a floor plate having side rails with outwardly extending flanges, a unitary locking bar comprising a pair of legs having downwardly turned hook ends connected by a cross bar to hook over the wall of the lower floor structure and prevent rearward shifting of said dockboard, the legs of said bar being disposed outwardly of said flanges and pivotally connected to said side rails interjacent the ends thereof to swing in a vertical path, resilient latch members on said rails adjacent the front ends thereof to retain said locking bar in inoperative position, said latch members being fixed to said side rails within the flanges thereof and leading outwardly at an angle from the outer side faces of said rails, thence being turned horizontally and extending outwardly into the paths of the legs of said locking bar to form shelves on which the respective legs of said locking bar are supported when the bar is raised to inoperative position, said latches terminating in inwardly and downwardly bent portions which are disposed in the path of the legs of said locking bar so as to be engaged by said legs when said locking bar is swung upwardly to press said latches inwardly and permit said legs to be raised to inoperative position.

3. In a dockboard adapted to span the space between and provide a connecting runway between two spaced-apart floor structures of different height, a floor plate having side rails with outwardly projecting flanges, locking bar means including a downwardly turned terminal hook extending downwardly and forwardly to hook over the wall of the lower floor structure and prevent rearward shifting of said dockboard, said bar means being disposed outwardly of said flanges and pivotally connected to said side rails interjacent the ends of said side rails to swing in a vertical plane, resilient latch members disposed within the flanges of said side rails fixed to said side rails forwardly of the points of connection of said bar means to retain said locking bar means in inoperative position in substantial alignment with said rails, said latches leading outwardly at an angle from the outer side faces of said rails and including substantially horizontally disposed shelve portions to support said locking bar means and normally disposed in the path of said bar means, the horizontally disposed shelve portions having inwardly inclined portions normally disposed in the path of said bar means which when engaged by said bar means direct said latches to swing inwardly and thus permit passage of said bar means to inoperative position.

4. In a dockboard adapted to span the space between and provide a connecting runway between two spaced-apart floor structures of different height, a floor plate having recessed side rails, locking bar means including a downwardly turned terminal hook extending downwardly and forwardly from said plate to hook over the wall of the lower floor structure and prevent rearward shifting of said dockboard, said bar means being disposed outwardly of said side rails and pivotally connected to said side rails interjacent the ends thereof to swing in a vertical plane, resilient latch members disposed within said recessed side rails fixed to said side rails adjacent the front ends thereof to retain said locking means in inoperative position in substantial alignment with said rails, said latches leading outwardly at an angle from the recessed faces of said rails and including substantially horizontally disposed shelve portions to support said locking bar means and normally disposed in the path of said bar means, the horizontally disposed shelve portions having inwardly inclined portions normally disposed in the path of said bar means which when engaged by said bar means direct said latches to swing inwardly and thus permit passage of said bar means to inoperative position.

DON C. LAW.

References Cited in the file of this patent

UNITED STATES PATENTS

| Number | Name | Date |
|---|---|---|
| 392,224 | Reece | Nov. 6, 1888 |
| 686,490 | Uphoff | Nov. 12, 1901 |
| 1,103,155 | Niswanger | July 14, 1914 |
| 2,337,138 | Van Berg | Dec. 21, 1943 |
| 2,358,607 | Tinnerman | Sept. 19, 1944 |
| 2,521,349 | Diamond | Sept. 5, 1950 |